(12) United States Patent
Wang et al.

(10) Patent No.: US 10,885,702 B2
(45) Date of Patent: Jan. 5, 2021

(54) FACIAL EXPRESSION MODELING METHOD, APPARATUS AND NON-TRANSITORY COMPUTER READABLE MEDIUM OF THE SAME

(71) Applicant: HTC Corporation, Taoyuan (TW)

(72) Inventors: Shih-Hao Wang, Taoyuan (TW); Hsin-Ching Sun, Taoyuan (TW); Cheng-Hsien Lin, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/517,669

(22) Filed: Jul. 22, 2019

(65) Prior Publication Data

US 2020/0051326 A1    Feb. 13, 2020

Related U.S. Application Data

(60) Provisional application No. 62/717,002, filed on Aug. 10, 2018.

(51) Int. Cl.
*G06T 17/00* (2006.01)
*G06T 7/00* (2017.01)

(52) U.S. Cl.
CPC .......... *G06T 17/00* (2013.01); *G06T 7/97* (2017.01); *G06T 2207/20081* (2013.01); *G06T 2207/20228* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2005/0083248 A1* | 4/2005 | Biocca | ................. | H04N 13/194 345/8 |
| 2011/0304708 A1* | 12/2011 | Ignatov | ................ | H04N 13/128 348/51 |
| 2018/0059679 A1* | 3/2018 | Taimouri | .................. | G06T 7/50 |
| 2019/0364206 A1* | 11/2019 | Dal Mutto | ................ | G06T 7/85 |
| 2019/0385360 A1* | 12/2019 | Yang | ...................... | G01C 21/32 |

FOREIGN PATENT DOCUMENTS

| | | |
|---|---|---|
| CN | 108304789 A | 7/2018 |
| TW | 201120802 A1 | 6/2011 |

OTHER PUBLICATIONS

Vladimir A. Knyaz et al.,"Deep Learning of Convolutional Auto-encoder for Image Matching and 3D Object Reconstruction in the Infrared Range", 2017 IEEE International Conference on Computer Vision Workshops (ICCVW), pp. 2155-2164.
Corresponding Taiwan office action dated May 18, 2020.

* cited by examiner

*Primary Examiner* — Frank S Chen
(74) *Attorney, Agent, or Firm* — CKC & Partners Co., LLC

(57) ABSTRACT

A facial expression modeling method used in a facial expression modeling apparatus is provided that includes the steps outlined below. Two two-dimensional images of a facial expression retrieved by two image retrieving modules respectively are received. A deep learning process is performed on the two two-dimensional images to generate a disparity map. The two two-dimensional images and the disparity map are concatenated to generate a three-channel feature map. The three-channel feature map is processed by a weighting calculation neural network to generate a plurality of blend-shape weightings. A three-dimensional facial expression is modeled according to the blend-shape weightings.

15 Claims, 2 Drawing Sheets

FACIAL EXPRESSION MODELING METHOD, APPARATUS AND NON-TRANSITORY COMPUTER READABLE MEDIUM OF THE SAME

RELATED APPLICATIONS

This application claims priority to U.S. Provisional Application Ser. No. 62/717,002, filed Aug. 10, 2018, which is herein incorporated by reference.

BACKGROUND

Field of Disclosure

The present disclosure relates to facial expression modeling technology. More particularly, the present disclosure relates to a facial expression modeling method and a facial expression modeling apparatus.

Description of Related Art

Capturing and processing human geometry, appearance, and motion are at the core of modern computer animation. Digital actors are often created through a combination of 3D scanning and appearance acquisition. However, disadvantageously, the existing methods may not accurately predict the weights that represent the detail of the facial expression.

Accordingly, what is needed is a facial expression modeling method and a facial expression modeling apparatus to address the above issues.

SUMMARY

An aspect of the present disclosure is to provide a facial expression modeling method used in a facial expression modeling apparatus that includes the steps outlined below. Two two-dimensional images of a facial expression retrieved by two image retrieving modules respectively are received. A deep learning process is performed on the two two-dimensional images to generate a disparity map. The two two-dimensional images and the disparity map are concatenated to generate a three-channel feature map. The three-channel feature map is processed by a weighting calculation neural network to generate a plurality of blend-shape weightings. A three-dimensional facial expression is modeled according to the blend-shape weightings.

Another aspect of the present disclosure is to provide a facial expression modeling apparatus that includes two image retrieving modules, a storage module and a processing module. The storage module is configured to store a plurality of computer executable commands. The processing module is electrically coupled to the storage module and is configured to retrieve and execute the computer executable commands to execute a facial expression modeling method. The facial expression modeling method includes the steps outlined below. Two two-dimensional images of a facial expression retrieved by the image retrieving modules respectively are received. A deep learning process is performed on the two two-dimensional images to generate a disparity map. The two two-dimensional images and the disparity map are concatenated to generate a three-channel feature map. The three-channel feature map is processed by a weighting calculation neural network to generate a plurality of blend-shape weightings. A three-dimensional facial expression is modeled according to the blend-shape weightings.

Yet another aspect of the present disclosure is to provide a non-transitory computer readable medium that stores an application program to execute facial expression modeling method used in a facial expression modeling apparatus. The facial expression modeling method includes the steps outlined below. Two two-dimensional images of a facial expression retrieved by two image retrieving modules respectively are received. A deep learning process is performed on the two two-dimensional images to generate a disparity map. The two two-dimensional images and the disparity map are concatenated to generate a three-channel feature map. The three-channel feature map is processed by a weighting calculation neural network to generate a plurality of blend-shape weightings. A three-dimensional facial expression is modeled according to the blend-shape weightings.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
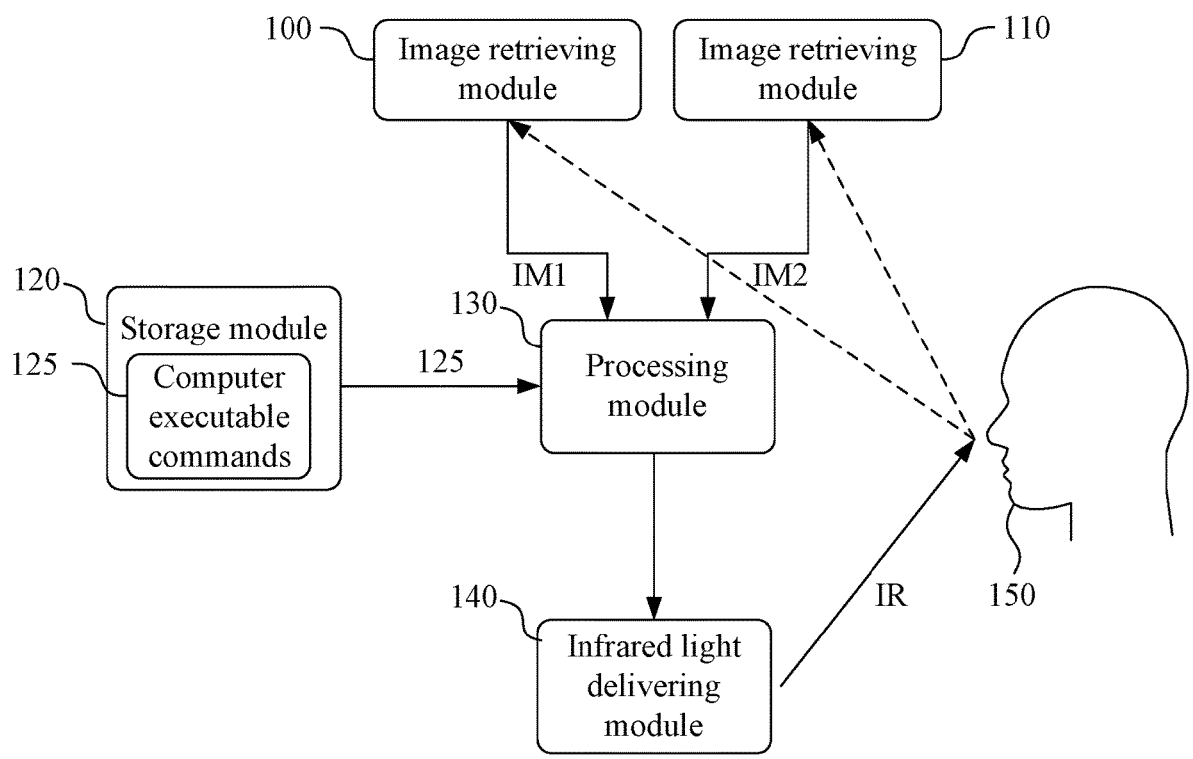
FIG. 1 is a block diagram of a facial expression modeling apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is now made to FIG. 1. FIG. 1 is a block diagram of a facial expression modeling apparatus 1 in an embodiment of the present invention. The facial expression modeling apparatus 1 includes two image retrieving modules 100 and 110, a storage module 120 and a processing module 130.

In an embodiment, the image retrieving modules 100 and 110 are electrically coupled to the processing module 130. The two image retrieving modules 100 and 110 are configured to retrieve two two-dimensional images IM1 and IM2. More specifically, the image retrieving module 100 retrieves the two-dimensional image IM1 and the image retrieving module 110 retrieves the two-dimensional image IM2.

In an embodiment, the storage module 120 can be such as, but not limited to a optical disk, a random access memory (RAM), a read only memory (ROM), a floppy disk, a hard disk or a compatible disk. The storage module 120 is configured to store a plurality of computer executable commands 125.

The processing module 130 is electrically coupled to the storage module 120. In an embodiment, the processing module 130 is configured to retrieve and execute the computer executable commands 125 to execute a function of the facial expression modeling apparatus 1. More specifically, the processing module 130 receives the two-dimensional images IM1 and IM2 retrieved by the image retrieving modules 100 and 110 to perform facial expression modeling according to the two-dimensional images IM1 and IM2.

The operation of the facial expression modeling apparatus 1 is described in detail in the following paragraphs.

Figure 2:
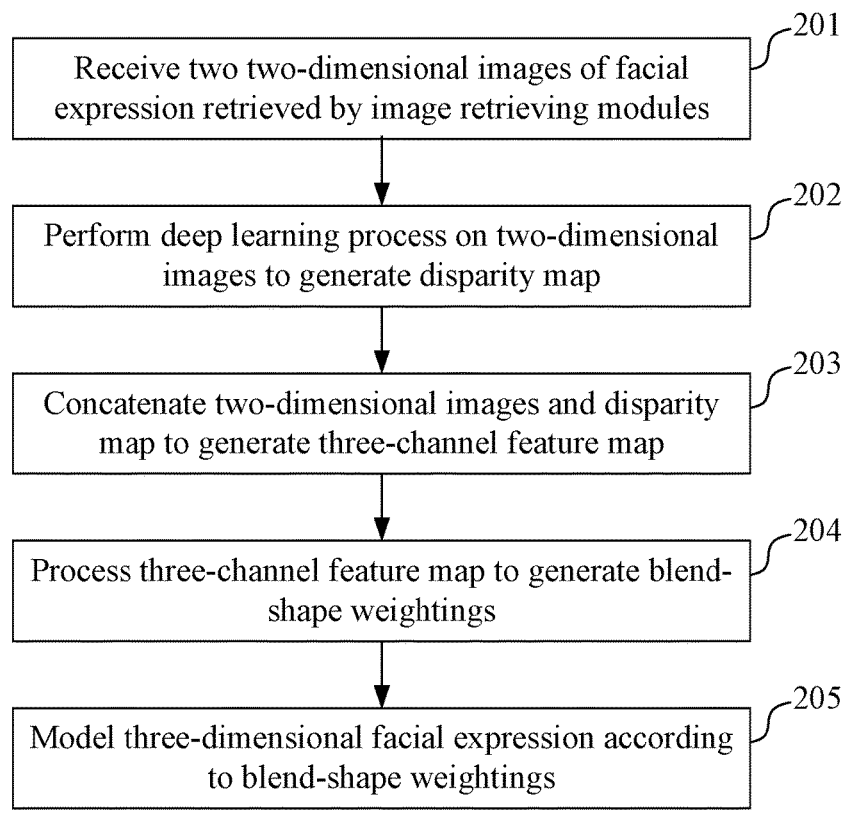
FIG. 2 is a flow chart of a facial expression modeling method in an embodiment of the present invention.
Figure 3:
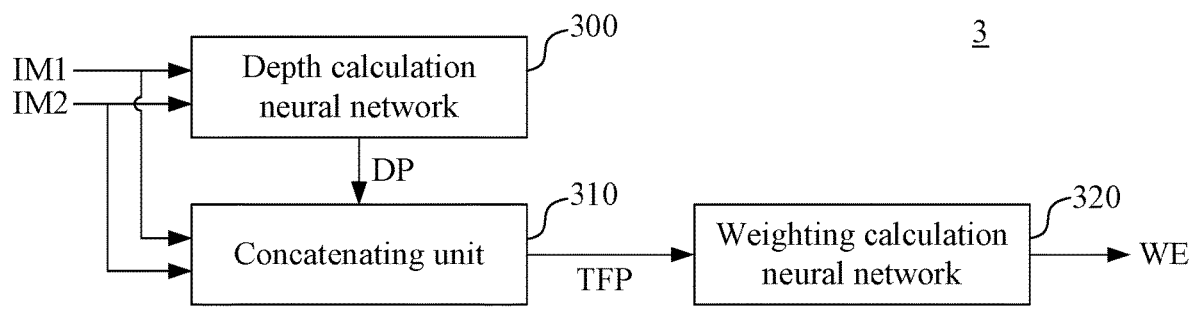
FIG. 3 is a block diagram of a system implemented according to the operation of the facial expression modeling apparatus in an embodiment of the present invention.

Reference is now made to FIG. 2 and FIG. 3 at the same time.

FIG. 2 is a flow chart of a facial expression modeling method 200 in an embodiment of the present invention. The facial expression modeling method 200 can be used in the facial expression modeling apparatus 1 illustrated in FIG. 1, or be implemented by using other hardware components such as a common processor, a computer, a server, other unique hardware devices that have a specific logic circuit or an equipment having a specific function, e.g. a unique hardware integrated by a computer program and a processor or a chip. More specifically, the facial expression modeling method 200 is implemented by using a computer program to control the modules in the facial expression modeling apparatus 1. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

FIG. 3 is a block diagram of a system 3 implemented according to the operation of the facial expression modeling apparatus 1 in an embodiment of the present invention. More specifically, when the processing module 130 executes the computer executable commands 125, the computer executable commands 125 operate as modules of the system 3 to perform the facial expression modeling method 200. The system 3 includes a depth calculation neural network 300, a concatenating unit 310 and a weighting calculation neural network 320.

The facial expression modeling method 200 includes the steps outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 201, the two two-dimensional images IM1 and IM2 of a facial expression retrieved by the image retrieving modules 100 and 110 respectively are received by the depth calculation neural network 300.

It is appreciated that in FIG. 1, the two image retrieving modules 100 and 110 are illustrated as a part of the facial expression modeling apparatus 1. However, in other embodiments, the two image retrieving modules 100 and 110 are not necessary be a part of the facial expression modeling apparatus 1.

More specifically, in an embodiment, the processing module 130 may receive the two-dimensional images IM1 and IM2 from the image retrieving modules 100 and 110 disposed in the facial expression modeling apparatus 1. In other embodiments, the processing module 130 may receive the two-dimensional images IM1 and IM2 stored in the storage module 120 or from a remote server accessed by using a wired or wireless method, in which the two-dimensional images IM1 and IM2 are retrieved by the image retrieving modules 100 and 110 disposed outside of the facial expression modeling apparatus 1.

In an embodiment, each of the two image retrieving modules 100 and 110 in FIG. 1 is an infrared light image-retrieving module. The facial expression modeling apparatus 1 may further includes an infrared light delivering module 140 configured to deliver an infrared light IR to a face 150 illustrated in FIG. 1 that has the facial expression such that the two image-retrieving modules 100 and 110 retrieve two two-dimensional images IM1 and IM2, in which in an embodiment, the two two-dimensional images IM1 and IM2 retrieved by the infrared light image-retrieving modules are gray-scale images.

In other embodiments, the image retrieving modules 100 and 110 can respectively implemented by the image retrieving modules that use color image sensors to retrieve color images. The present invention is not limited thereto.

In step 202, a deep learning process is performed on the two two-dimensional images IM1 and IM2 to generate a disparity map DP by the depth calculation neural network 300.

In an embodiment, the depth calculation neural network 300 is a convolution neural network (CNN) to perform convolution on the two-dimensional images IM1 and IM2 to generate the disparity map DP that includes the depth information of the facial expression.

In step 203, the two two-dimensional images IM1 and IM2 and the disparity map DP are concatenated by the concatenating unit 310 to generate a three-channel feature map TFP.

In an embodiment, each of the two-dimensional images IM1 and IM2 and the disparity map DP has a dimension of X×Y. As a result, after the concatenating unit 310 concatenates the two two-dimensional images IM1 and IM2 and the disparity map DP, the three-channel feature map TFP generated therefrom has a dimension of X×Y×3.

In step 204, the three-channel feature map TFP is processed by the weighting calculation neural network 320 to generate a plurality of blend-shape weightings WE.

In an embodiment, for different facial expressions, different parts of the face play different roles due to distinct movement of facial muscles. As a result, the blend-shape weightings WE are associated with different facial regions for different expressions.

In an embodiment, the weighting calculation neural network 320 is also a convolution neural network to perform convolution on the three-channel feature map TFP. As a result, not only the two-dimensional positions of different facial regions are taken into consideration, but also the depth information of the facial regions can be used to distinguish more details of different facial expressions.

The configuration of the weighting calculation neural network 320 includes input nodes corresponding to layer of the three-channel feature map TFP, output nodes corresponding to the number of the blend-shape weightings WE and at least one hidden layer for performing convolution.

It is appreciated that the number of the blend-shape weightings WE can be different depending on practical requirements.

In step 205, a three-dimensional facial expression is modeled according to the blend-shape weightings WE.

In an embodiment, the three-dimensional facial expression can be modeled and applied to an avatar, i.e. a user's graphic representation.

It is appreciated that in an embodiment, the processing module 130 can calculate a difference value between the blend-shape weightings WE and a plurality of predetermined weightings to evaluate an accuracy of the blend-shape weightings WE, in which the predetermined weightings are ground truth values determined by such as, but not limited to a user. The processing module 130 models the three-dimensional facial expression only when the difference value is smaller than a predetermined value, i.e. when the blend-shape weightings WE are close to the predetermined weightings.

In an embodiment, the difference value is a mean-square error between the blend-shape weightings WE and the predetermined weightings.

In summary, the facial expression modeling apparatus 1 and the facial expression modeling method 200 of the present invention can generate the blend-shape weightings WE according to the two two-dimensional images IM1 and IM2 based on not only the two-dimensional positional information thereof but also the depth information therebetween. A more accurate modeling of the facial expression can thus be generated.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A facial expression modeling method used in a facial expression modeling apparatus, the facial expression modeling method comprises:
receiving two two-dimensional images of a facial expression retrieved by two image-retrieving modules respectively;
performing a deep learning process on the two two-dimensional images to generate a disparity map;
concatenating the two two-dimensional images and the disparity map to generate a three-channel feature map;
processing the three-channel feature map by a weighting calculation neural network to generate a plurality of blend-shape weightings;
modeling a three-dimensional facial expression according to the blend-shape weightings; and
calculating a difference value between the blend-shape weightings and a plurality of predetermined weightings to evaluate an accuracy of the blend-shape weightings.

2. The facial expression modeling method of claim 1, wherein the weighting calculation neural network is a convolution neural network (CNN) configured to perform convolution on the three-channel feature map to generate the blend-shape weightings.

3. The facial expression modeling method of claim 1, further comprising:
performing the deep learning process on the two two-dimensional images by a depth calculation neural network to generate the disparity map, wherein the depth calculation neural network is a convolution neural network.

4. The facial expression modeling method of claim 1, wherein the difference value is a mean-square error between the blend-shape weightings and the predetermined weightings.

5. The facial expression modeling method of claim 1, wherein each of the two image-retrieving modules is an infrared light image-retrieving module, and the facial expression modeling method further comprises:
delivering an infrared light to a face by an infrared light delivering module such that the two image-retrieving modules retrieve the two two-dimensional images.

6. A facial expression modeling apparatus comprising:
a storage module configured to store a plurality of computer executable commands; and
a processing module electrically coupled to the storage module and configured to retrieve and execute the computer executable commands to execute a facial expression modeling method, the facial expression modeling method comprises:
receiving two two-dimensional images of a facial expression retrieved by two image-retrieving modules respectively;
performing a deep learning process on the two two-dimensional images to generate a disparity map;
concatenating the two two-dimensional images and the disparity map to generate a three-channel feature map;
processing the three-channel feature map by a weighting calculation neural network to generate a plurality of blend-shape weightings;
modeling a three-dimensional facial expression according to the blend-shape weightings; and
calculating a difference value between the blend-shape weightings and a plurality of predetermined weightings to evaluate an accuracy of the blend-shape weightings.

7. The facial expression modeling apparatus of claim 6, wherein the weighting calculation neural network is a convolution neural network (CNN) configured to perform convolution on the three-channel feature map to generate the blend-shape weightings.

8. The facial expression modeling apparatus of claim 6, wherein the facial expression modeling method further comprises:

performing the deep learning process on the two two-dimensional images by a depth calculation neural network to generate the disparity map, wherein the depth calculation neural network is a convolution neural network.

9. The facial expression modeling apparatus of claim 6, wherein the difference value is a mean-square error between the blend-shape weightings and the predetermined weightings.

10. The facial expression modeling apparatus of claim 6, wherein each of the two image-retrieving modules is an infrared light image-retrieving module, and the facial expression modeling method further comprises:
  delivering an infrared light to a face by an infrared light delivering module such that the two image-retrieving modules retrieve the two two-dimensional images.

11. A non-transitory computer readable medium that stores an application program to execute facial expression modeling method used in a facial expression modeling apparatus, wherein the facial expression modeling method comprises:
  receiving two two-dimensional images of a facial expression retrieved by two image-retrieving modules respectively;
  performing a deep learning process on the two two-dimensional images to generate a disparity map;
  concatenating the two two-dimensional images and the disparity map to generate a three-channel feature map;
  processing the three-channel feature map by a weighting calculation neural network to generate a plurality of blend-shape weightings;
  modeling a three-dimensional facial expression according to the blend-shape weightings; and
  calculating a difference value between the blend-shape weightings and a plurality of predetermined weightings to evaluate an accuracy of the blend-shape weightings.

12. The non-transitory computer readable medium of claim 11, wherein the weighting calculation neural network is a convolution neural network (CNN) configured to perform convolution on the three-channel feature map to generate the blend-shape weightings.

13. The non-transitory computer readable medium of claim 11, wherein the facial expression modeling method further comprises:
  performing the deep learning process on the two two-dimensional images by a depth calculation neural network to generate the disparity map, wherein the depth calculation neural network is a convolution neural network.

14. The non-transitory computer readable medium of claim 11, wherein the difference value is a mean-square error between the blend-shape weightings and the predetermined weightings.

15. The non-transitory computer readable medium of claim 11, wherein each of the two image-retrieving modules is an infrared light image-retrieving module, and the facial expression modeling method further comprises:
  delivering an infrared light to a face by an infrared light delivering module such that the two image-retrieving modules retrieve the two two-dimensional images.

* * * * *